(12) United States Patent
Kato et al.

(10) Patent No.: US 7,169,324 B2
(45) Date of Patent: Jan. 30, 2007

(54) GELLING AGENT AND PRODUCTION METHOD THEREOF, LIQUID CRYSTAL COMPOSITION AND CHARGE TRANSFER COMPLEX

(75) Inventors: Takashi Kato, Kawasaki (JP); Tetsu Kitamura, Tokyo (JP); Norihiro Mizoshita, Tokyo (JP); Yusuke Tochigi, Tokyo (JP)

(73) Assignee: JSR Corporation, Tokyo (JP)

( * ) Notice: Subject to any disclaimer, the term of this patent is extended or adjusted under 35 U.S.C. 154(b) by 406 days.

(21) Appl. No.: 10/796,981

(22) Filed: Mar. 11, 2004

(65) Prior Publication Data

US 2006/0208220 A1 Sep. 21, 2006

(51) Int. Cl.
*C09K 19/52* (2006.01)
*C09K 19/54* (2006.01)
*C09K 19/58* (2006.01)
*C07D 339/06* (2006.01)

(52) U.S. Cl. .............................. 252/299.01; 252/299.3; 252/299.5; 549/35; 549/36; 549/37; 549/39; 549/40

(58) Field of Classification Search ................ 549/35, 549/36, 37, 39, 40; 252/299.2, 299.3, 299.01, 252/299.5
See application file for complete search history.

(56) References Cited

U.S. PATENT DOCUMENTS 7,037,444 B2 * 5/2006 Kato et al. ............. 252/299.01

OTHER PUBLICATIONS

M. Jørgensen, et al., J. Org. Chem., vol. 59, pp. 5877-5882, "Synthesis and Structural Characterization of a Bis-Arborol-Tetrathiafulvalene Gel: Toward a Self-Assembling "Molecular" Wire", 1994.
N. Mizoshita, et al., Chem. Commun., pp. 781-782, "Smectic Liquid-Crystalline Physical Gels. Anisotropic Self-Aggregation of Hydrogen-Bonded Molecules in Layered Structures", 1999.
N. Mizoshita, et al., J. Mater. Chem., vol. 12, pp. 2197-2201, "Electrooptical Properties of Liquid-Crystalline Physical Gels: A New Oligo(Amino Acid) Gelator for Light Scattering Display Materials", 2002.
K. Hanabusa, et al., Chem. Mater., vol. 11, pp. 649-655, "Easy Preparation and Useful Character of Organogel Electrolytes Based on Low Molecular Weight Gelator", 1999.

* cited by examiner

*Primary Examiner*—Shean C Wu
(74) *Attorney, Agent, or Firm*—Oblon, Spivak, McClelland, Maier & Neustadt, P.C.

(57) ABSTRACT

Disclosed herein are a gelling agent composed of a functional amino acid compound having a tetrathiafulvalenyl group, and a production method of a gelling agent, comprising reacting a tetrathiafulvalene derivative with an amino acid derivative in the presence of 1-ethyl-3-(3-dimethylaminopropyl)carbodiimide hydrochloride and 4-(N,N-dimethylamino)pyridine to obtain a functional amino acid compound having a tetrathiafulvalenyl group.

10 Claims, 2 Drawing Sheets

GELLING AGENT AND PRODUCTION METHOD THEREOF, LIQUID CRYSTAL COMPOSITION AND CHARGE TRANSFER COMPLEX

TECHNICAL FIELD TO WHICH THE INVENTION BELONGS

The present invention relates to a gelling agent, which is mixed with a liquid crystal compound or the like to form a gelling mixture, a production method thereof, a liquid crystal composition composed of the gelling agent and a liquid crystal compound, and a charge transfer complex suitably used as a gelling agent.

PRIOR ART

In recent years, those composed of self-organizing low molecules that the molecules gather in a fibrous form by intermolecular interaction to form a fibrous molecular aggregate have attracted attention as gelling agents. Such a gelling agent is expected as, for example, a material for forming physical gel. As physical gel using a gelling agent, has been proposed, for example, a liquid crystal composition composed of the gelling agent and a liquid crystal compound (see, for example, Japanese Patent Reference.).

However, as a gelling agent having gel-forming ability for organic solvents and liquid crystal compounds, no gelling agent composed of self-organizing low molecules having a molecular structure that a tetrathiafulvalene component has been introduced as a functional component has been known.

Self-organizing low molecules having a tetrathiafulvalene component and forming a fibrous aggregate have been reported in Non-patent Reference 1. However, solvents that can be gelled by such a self-organizing molecule are limited to aqueous solutions.

[Patent Reference 1] Japanese patent application No. 2002-4462

[Non-patent Reference 1] Journal of Organic Chemistry, Vol. 59, pp. 5877-5882 (1994)

DISCLOSURE OF THE INVENTION

Problems that the Invention is to Solve

The present invention has been completed as a result of repeated research on self-organizing low molecules, which form fibrous aggregates and has as its first object the provision of a novel gelling agent using a functional amino acid compound having a molecular structure that a tetrathiafulvalene component has been introduced.

A second object of the present invention is to provide a method for producing a novel gelling agent.

A third object of the present invention is to provide a novel liquid crystal composition, in which a fibrous aggregate formed by a gelling agent is formed in a state controlled by the orientated state of a liquid crystal compound at a condition that the liquid crystal compound has been orientated in one direction.

A fourth object of the present invention is to provide a novel charge transfer complex which comprises a functional amino acid compound having a molecular structure that a tetrathiafulvalene component has been introduced, and an electron acceptable compound in combination and can be suitably used as a gelling agent.

Means of Solving the Problems

According to the present invention, there is provided a gelling agent composed of a functional amino acid compound having a tetrathiafulvalenyl group.

The gelling agent according to the present invention may preferably be composed of a functional amino acid compound having a tetrathiafulvalenyl group and represented by the following general formula (1).

[Chemical Formula 1]

General formula (1):

(In the formula, X denotes a single bond or a divalent organic group, Y denotes a monovalent organic group, and n is an integer of 8 to 18.)

According to the present invention, there is provided a method for producing a gelling agent, which comprises reacting a tetrathiafulvalene derivative with an amino acid derivative in the presence of 1-ethyl-3-(3-dimethylaminopropyl)carbodiimide hydrochloride and 4-(N,N-dimethylamino)pyridine to obtain a functional amino acid compound having a tetrathiafulvalenyl group.

According to the present invention, there is provided a liquid crystal composition comprising a liquid crystal compound and a gelling agent, which is mixed with the liquid crystal compound to form a gelling mixture, wherein the liquid crystal compound is composed of a compound exhibiting a nematic phase or smectic phase, and the gelling agent is a gelling agent composed of a functional amino acid compound having a tetrathiafulvalenyl group.

In the liquid crystal composition according to the present invention, it may be preferable that the liquid crystal compound be 4-octyl-4'-cyanobiphenyl, and the gelling agent be composed of a functional amino acid compound having a tetrathiafulvalenyl group and represented by the following formula (1).

[Chemical Formula 2]

Formula (1):

In the liquid crystal composition according to the present invention, it may be preferable that the liquid crystal compound be a mixture of 4-heptyloxy-4'-cyanobiphenyl and 4-decyloxy-4'-cyanobiphenyl, and the gelling agent be composed of a functional amino acid compound having a tetrathiafulvalenyl group and represented by the following formula (1).

[Chemical Formula 3]

Formula (1):

According to the present invention, there is provided a gelling agent composed of a charge transfer complex comprising, in combination, a functional amino acid compound having a tetrathiafulvalenyl group and an electron acceptable compound selected from a group consisting of iodine, bromine and tetracyanoquinodimethane.

In the gelling agent according to the present invention, the functional amino acid compound may preferably be a compound having a tetrathiafulvalenyl group and represented by the following general formula (1).

[Chemical Formula 4]

General formula (1):

(In the formula, X denotes a single bond or a divalent organic group, Y denotes a monovalent organic group, and n is an integer of 8 to 18.)

According to the present invention, there is provided a liquid crystal composition comprising a liquid crystal compound and a gelling agent, which is mixed with the liquid crystal compound to form a gelling mixture, wherein the liquid crystal compound is composed of a compound exhibiting a nematic phase or smectic phase, and the gelling agent is the gelling agent described above.

According to the present invention, there is provided a charge transfer complex comprising, in combination, a functional amino acid compound having a tetrathiafulvalenyl group and an electron acceptable compound selected from a group consisting of iodine, bromine and tetracyanoquinodimethane.

In the charge transfer complex according to the present invention, the functional amino acid compound may preferably be a compound having a tetrathiafulvalenyl group and represented by the following general formula (1).

[Chemical Formula 5]

General formula (1):

(In the formula, X denotes a single bond or a divalent organic group, Y denotes a monovalent organic group, and n is an integer of 8 to 18.)

EFFECTS OF THE INVENTION

The first gelling agent according to the present invention is a gelling agent composed of a functional amino acid compound having a molecular structure that a tetrathiafulvalene component derived from electronically active tetrathiafulvalene has been introduced into an amino acid derivative.

Since the gelling agent has excellent gel-forming ability, and a functional component composed of the tetrathiafulvalene component is introduced into it, it can form a fibrous aggregate having an electron-conductive function.

According to the production method of a gelling agent of the present invention, a novel gelling agent with a tetrathiafulvalene component introduced into an amino acid derivative can be prepared.

The second gelling agent according to the present invention is a gelling agent composed of a charge transfer complex comprising, in combination, an electron donor composed of a functional amino acid compound having a molecular structure that a tetrathiafulvalene component derived from electronically active tetrathiafulvalene has been introduced into an amino acid derivative, and an electron acceptor composed of an electron acceptable compound selected from a group consisting of iodine, bromine and tetracyanoquinodimethane.

Since a complex formed by introducing the electron acceptor into the functional amino acid compound as an electron donor is formed, the gelling agent can form a fibrous aggregate having excellent heat stability and high conductivity.

The liquid crystal composition according to the present invention is a novel liquid crystal composition, in which a fibrous aggregate formed by gelling agent is formed in a state controlled by the orientated state of a liquid crystal compound at a condition that the liquid crystal compound has been orientated in one direction.

PRACTICAL MODES OF INVENTION

The present invention will hereinafter be described in detail.

The gelling agents according to the present invention are gelling agents having the following constitutions (a) and (b), respectively:

(a) a gelling agent (hereinafter also referred to as "first gelling agent") composed of a functional amino acid compound having a tetrathiafulvalenyl group; and (b) a gelling agent (hereinafter also referred to as "second gelling agent") composed of a charge transfer complex comprising, in combination, a functional amino acid compound having a tetrathiafulvalenyl group and an electron acceptable compound selected from a group consisting of iodine, bromine and tetracyanoquinodimethane.

<First Gelling Agent>

A specific preferable example of the first gelling agent according to the present invention includes that composed of a functional amino acid compound (hereinafter also referred to as "specific functional amino acid compound") having a tetrathiafulvalenyl group and represented by the above general formula (1).

In the specification of the present invention, the tetrathiafulvalenyl group may have any substituent group.

In the general formula (1), X denotes a single bond or a divalent organic group. Examples of the divalent organic group forming X include —CH$_2$OCH$_2$— group, —S—CH$_2$— group, —CH$_2$O(CH$_2$)$_3$— group, —CH$_2$— group, —CH$_2$CH$_2$— group, —CH═CH— group and —CH═CHCH$_2$— group.

Among these, a —CH$_2$OCH$_2$— group is preferred as the group X.

In the general formula (1), Y denotes a monovalent organic group. Examples of the monovalent organic group forming Y include sec-butyl group, isopropyl group, isobutyl group and benzyl group.

Among these, a sec-butyl group is preferred as the group Y.

n is an integer of 8 to 18, preferably 12 to 18.

Specific examples of the specific functional amino acid compound include a functional amino acid compound (hereinafter also referred to as "Specific Functional Amino Acid Compound (1)") having a tetrathiafulvalenyl group and represented by the above formula (1) and a functional amino acid compound (hereinafter also referred to as "Specific Functional Amino Acid Compound (2)") having a tetrathiafulvalenyl group and represented by the following formula (2). Among these, Specific Functional Amino Acid Compound (1) is preferred because it has excellent gel-forming ability.

[Chemical Formula 6]

Formula (2):

Such a first gelling agent can be prepared by using a tetrathiafulvalene derivative represented by the following general formula (2) and a specific amino acid derivative (hereinafter also referred to as "Specific Amino Acid Derivative") represented by the following general formula (3) as raw materials and reacting these raw materials in the presence of 1-ethyl-3-(3-dimethylaminopropyl)carbodiimide hydrochloride and 4-(N,N-dimethylamino)pyridine to obtain a specific functional amino acid compound.

[Chemical Formula 7]

General formula (2):

(In the formula X denotes a single bond or a divalent organic group.)

[Chemical Formula 8]

General formula (3):

(In the formula Y denotes a monovalent organic group, and n is an integer of 8 to 18.)

In this reaction, the number of moles of the tetrathiafulvalene derivative and the number of moles of the Specific Amino Acid Derivative are substantially equivalent to each other and preferably in an equimolar relation.

The amount of 1-ethyl-3-(3-dimethylaminopropyl)-carbodiimide hydrochloride used is preferably 100 to 1,000 parts by mass per 100 parts by mass of the tetrathiafulvalene derivative.

The amount of 4-(N,N-dimethylamino)pyridine used is preferably 2 to 10 parts by mass per 100 parts by mass of the tetrathiafulvalene derivative.

Examples of a solvent used in this reaction process include tetrahydrofuran and dichloromethane.

These solvents may be used either singly or in any combination thereof.

The amount of the solvent used is preferably 50 to 200 ml per gram of the tetrathiafulvalene derivative.

The reaction temperature is, for example, room temperature (25° C.), and the reaction time is, for example, 1 to 24 hours.

Synthesis processes of Specific Functional Amino Acid Compound (1) in the case where the first gelling agent composed of Specific Functional Amino Acid Compound (1) is prepared is shown in the following reaction scheme (1). Synthesis processes of Specific Functional Amino Acid Compound (2) in the case where the first gelling agent composed of Specific Functional Amino Acid Compound (2) is prepared is shown in the following reaction scheme (2).

[Chemical Formula 9]

Reaction scheme (1):

Tetrathiafulvalene Derivative

-continued

Specific Amino Acid Derivative

Specific Functional Amino Acid Compound (1)

[Chemical Formula 10]

Reaction scheme (2):

Tetrathiafulvalene Derivative

Specific Amino Acid Derivative

Specific Functional Amino Acid Compound (2)

The first gelling agent composed of the specific functional amino acid compound may also be prepared by any other process than the production methods described above.

Such a first gelling agent composed of the specific functional amino acid compound is preferred as the first gelling agent. However, the first gelling agent is not limited thereto, and it is only necessary to consist of a functional amino acid compound having the tetrathiafulvalenyl group.

Specifically, the functional amino acid compound constituting the first gelling agent may be an amino acid compound having groups (hereinafter also referred to as "hydrogen bond forming groups") capable of forming an intermolecular hydrogen bond by, for example, —NH— group and —CO— group, and a molecular structure having the tetrathiafulvalenyl group.

Such a functional amino acid compound can be synthesized by, for example, a method in which a tetrathiafulvalene derivative is reacted with an amino acid derivative such as an isoleucine derivative, leucine derivative or valine derivative in the presence of 1-ethyl-3-(3-dimethylaminopropyl)carbodiimide hydrochloride and 4-(N,N-dimethylamino)pyridine.

Figure 1:
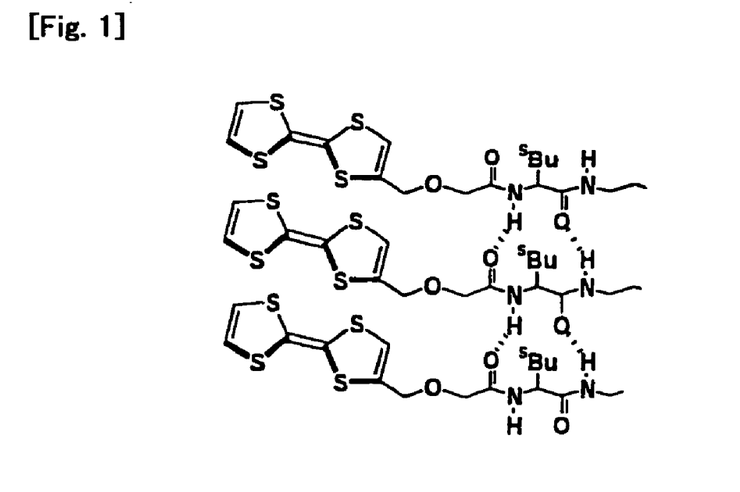

The first gelling agent described above becomes a fibrous aggregate aggregated in a fibrous form in a state that a number of molecules have been regularly arranged by forming hydrogen bonds between molecules by the hydrogen bond forming groups as illustrated in FIG. 1. The gelling agent can thereby gel the whole mixture obtained by mixing it with an organic solvent or liquid crystal compound to substantially lose its flowability. Therefore, the gelling agent has good gel-forming ability for organic solvents and liquid crystal compounds, and the formed fibrous aggregate has an electron-conductive function derived from electronically active tetrathiafulvalene.

Examples of the organic solvents include acetone, ethanol, ethyl acetate, hexane, benzene, 1-octanol and toluene.

Examples of the liquid crystal compounds include cyanobiphenyl compounds such as 4-pentyl-4'-cyanobiphenyl, 4-octyl-4'-cyanobiphenyl, and a mixture of 4-heptyloxy-4'-cyanobiphenyl and 4-decyloxy-4'-cyanobiphenyl, phenylbenzoate compounds such as 4'-octylphenyl-4-heptyloxybenzoate, phenylcyclohexane compounds such as 4-(trans-4'-pentylcyclohexyl)benzonitrile, and phenylpyrimidine compounds such as 5'-octyl-2'-(4-octyloxyphenyl)pyrimidine.

<Second Gelling Agent>

A specific preferable example of the second gelling agent according to the present invention includes that composed of a charge transfer complex (hereinafter also referred to as "specific charge transfer complex") formed by combining a specific functional amino acid compound with an electron acceptable compound (hereinafter also referred to as "specific electron acceptable compound") selected from a group consisting of iodine, bromine and tetracyanoquinodimethane to form a complex.

Since the second gelling agent has gel-forming ability derived from the specific functional amino acid compound, and the complex is formed by introducing the electron acceptor into the functional amino acid compound as an electron donor, it can form a fibrous aggregate having excellent heat stability and high conductivity.

A specific preferable example of the specific functional amino acid compound forming the specific charge transfer complex include Specific Functional Amino Acid Compound (1).

Iodine among iodine, bromine and tetracyanoquinodimethane is particularly preferred as the specific electron acceptable compound forming the specific electron transfer complex.

The specific electron transfer complex constituting the second gelling agent can be obtained by adding the specific electron acceptable compound to the specific functional amino acid compound and mixing them. A fibrous aggregate formed by the resulting second gelling agent has further excellent heat stability as the proportion of the specific electron acceptable compound added becomes greater.

When iodine is used as the specific electron acceptable compound, the proportion of iodine added is preferably at least 0.25 equivalents to the specific functional amino acid compound. When the proportion of iodine added is at least 0.25 equivalents, a fibrous aggregate formed by the resulting second gelling agent has further excellent heat stability.

Such a second gelling agent composed of the specific charge transfer complex is preferred as the second gelling agent. However, the second gelling agent is not limited thereto, and it is only necessary to consist of a charge transfer complex comprising the functional amino acid compound having the hydrogen bond forming groups and the tetrathiafulvalenyl group and the specific electron acceptable compound in combination. Since the fibrous aggregate is formed by self-organization of this charge transfer complex, the gelling agent has good gel-forming ability for liquid crystal compounds, such as cyanobiphenyl compounds such as 4-pentyl-4'-cyanobiphenyl, phenylcyclohexane compounds such as 4-(trans-4'-pentylcyclohexyl)benzonitrile, and phenylbenzoate compounds such as a mixture of 4'-propyloxyphenyl-4-undecyloxybenzoate and 4'-butyloxyphenyl-4-undecyloxy-benzoate.

As described above, the charge transfer complex constituting the second gelling agent may be suitably used as a gelling agent. However, the uses of the charge transfer complex are not limited thereto.

Such gelling agents according to the present invention may be suitably used as materials for forming physical gel.

Specifically, examples of the physical gel formed by using the gelling agent according to the present invention include liquid crystal compositions composed of the gelling agent and a liquid crystal compound.

<Liquid Crystal Composition According to the Present Invention>

The liquid crystal composition according to the present invention is composed of a liquid crystal compound (hereinafter also referred to as "specific liquid crystal compound") exhibiting a nematic phase and smectic phase and the first or second gelling agent, which is mixed with the liquid crystal compound to form a gelling mixture.

In this liquid crystal composition according to the present invention, its transition temperature (hereinafter also referred to as "liquid—liquid crystal phase transition temperature") between an isotropic liquid phase and a liquid crystal phase is higher than a gelling temperature by the gelling agent.

In the specification, the term "gelling temperature" means a temperature at which a liquid crystal composition is transformed from liquid to gel when the liquid crystal composition is heated until it turns to liquid, and the liquid crystal composition in the liquid state is then cooled.

As the specific liquid crystal compound constituting the liquid crystal composition according to the present invention, may be used a liquid crystal compound such as a cyanobiphenyl compound, phenylbenzoate compound, phenylcyclohexane compound or phenylpyrimidine compound or a mixture thereof.

As specific preferable examples of the liquid crystal compound, may be mentioned cyanobiphenyl compounds such as 4-pentyl-4'-cyanobiphenyl, a mixture of 4-heptyloxy-4'-cyanobiphenyl and 4-decyloxy-4'-cyanobiphenyl, and 4-octyl-4'-cyanobiphenyl, phenylbenzoate compounds such as 4'-octylphenyl-4-heptyloxybenzoate, and a mixture of 4'-propyloxyphenyl-4-undecyloxybenzoate and 4'-butyloxyphenyl-4-undecyloxy-benzoate, phenylcyclohexane compounds such as 4-(trans-4'-pentylcyclohexyl)benzonitrile, and phenylpyrimidine compounds such as 5'-octyl-2'-(4-octyloxyphenyl-pyrimidine.

The proportion of the gelling agent contained in the liquid crystal composition according to the present invention varies according to the kind thereof. However, it is preferably 0.1 to 15% by mass based on 100% by mass in total of the gelling agent and the specific liquid crystal compound.

The liquid crystal composition according to the present invention forms a fibrous aggregate in a state that the gelling agent is controlled by the orientated state of the specific liquid crystal compound at a condition that the liquid crystal compound has been orientated in one direction.

Figure 2:
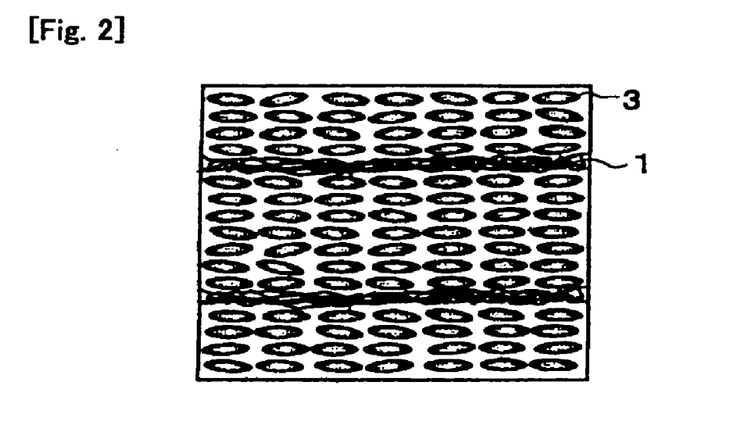
Figure 3:
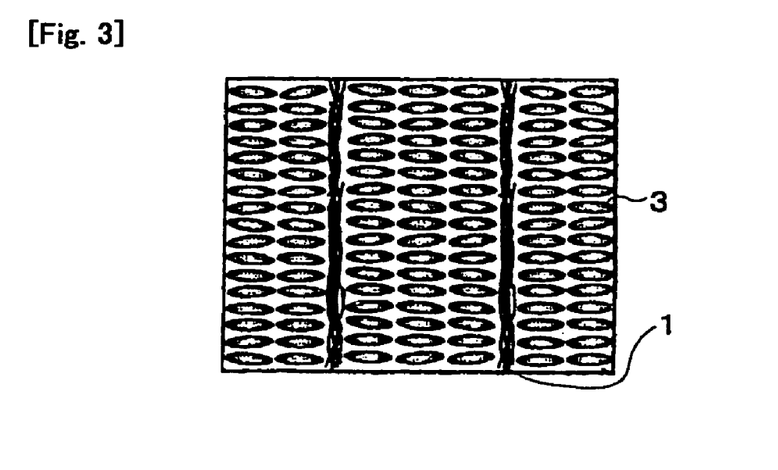

Specifically, the gelling agent forms a fibrous aggregate in the controlled state, whereby the fibrous aggregate is formed in a state orientated in the same direction as the orientated direction of molecules 3 of the specific liquid crystal compound as illustrated in FIG. 2, or formed in a state orientated in a direction perpendicular to the orientated direction of the molecules 3 of the specific liquid crystal compound as illustrated in FIG. 3.

Whether the gelling agent in the liquid crystal composition according to the present invention forms the fibrous aggregate orientated in the same direction as the specific liquid crystal compound or forms the fibrous aggregate orientated in the direction perpendicular to the specific liquid crystal compound is determined by, for example, its combination with a liquid crystal compound used. Examples of specific combinations of the specific liquid crystal compound and the gelling agent include the following composition (1) as a combination having property that the gelling agent is orientated in the same direction as the specific liquid crystal compound, and the following compositions (2) and (3) as combinations having property that the gelling agent is orientated in the direction perpendicular to the specific liquid crystal compound. However, the present invention is not limited to these combinations.

(1) A liquid crystal composition comprising 4-octyl-4'-cyanobiphenyl as a liquid crystal compound and a gelling agent composed of Specific Functional Amino Acid Compound (1).

(2) A liquid crystal composition comprising a mixture of 4-heptyloxy-4'-cyanobiphenyl and 4-decyloxy-4'-cyanobiphenyl as a liquid crystal compound and a gelling agent composed of Specific Functional Amino Acid Compound (1).

(3) A liquid crystal composition comprising a mixture of 4'-propyloxyphenyl-4-undecyloxybenzoate and 4'-butyloxyphenyl-4-undecyloxybenzoate as a liquid crystal compound and a gelling agent composed of the specific charge transfer complex comprising the specific functional amino acid compound and iodine in combination.

In the liquid crystal composition according to the present invention, the liquid—liquid crystal phase transition temperature of the liquid crystal compound is higher than the gelling temperature of the gelling agent. Therefore, the liquid crystal composition turns optically isotropic liquid when it lies at a temperature higher than the liquid—liquid crystal phase transition temperature of the liquid crystal compound, it turns optically anisotropic liquid (liquid crystal) when it lies at a temperature higher than the gelling temperature of the gelling agent, but not higher than the liquid—liquid crystal phase transition temperature of the liquid crystal compound, and it turns optically anisotropic gel (liquid crystal gel) by substantially losing its flowability when it lies at a temperature not higher than the gelling temperature of the gelling agent.

Such a liquid crystal composition as described above has a possibility of being suitably usable as, for example, a liquid crystal display device or anisotropically conductive material utilizing, for example, the electron-conductive function of the fibrous aggregate formed by the gelling agent.

In particular, the liquid crystal composition containing the second gelling agent as the gelling agent has a possibility of being applicable to, for example, a molecular electron device or molecular switch utilizing the high conductivity and heat stability of the fibrous aggregate formed by the second gelling agent.

EXAMPLE 1

(Synthesis Example 1 of Tetrathiafulvalene Derivative)

As shown in the following reaction scheme (3), 1.0 g of tetrathiafulvalene was reacted with 0.64 g of lithium diisopropylamide (LDA) in tetrahydrofuran (THF) under temperature conditions of −78° C., 1.35 g of N-phenyl-N-methylformamide was added to this system, and thereafter, hydrochloric acid was additionally added to conduct a reaction at room temperature (25° C.), thereby obtaining an intermediate product (1) at a yield of 70%. The intermediate product (1) thus obtained was reacted with 0.136 g of sodium tetrahydroborate at room temperature (25° C.) in methanol, thereby obtaining an intermediate product (2) at a yield of at least 99%.

After the intermediate product (2) thus obtained was then reacted with 0.42 g of sodium hydride at room temperature (25° C.) in tetrahydrofuran, 2.0 g of ethyl bromoacetate was added to this system to conduct a reaction at room temperature (25° C.), thereby obtaining an intermediate product (3) at a yield of 41%. The intermediate product (3) thus obtained was further reacted with 0.85 g of potassium hydroxide at 90° C. in a solvent composed of ethanol and water, thereby obtaining a tetrathiafulvalene derivative (hereinafter also referred to as "Tetrathiafulvalene Derivative (1)"), in which X in the general formula (2) denotes a —$CH_2OCH_2$— group, at a yield of at least 99%.

[Chemical Formula 11]

Reaction scheme (3):

(Preparation Example 1 of First Gelling Agent)

With 0.36 g of Tetrathiafulvalene Derivative (1), were mixed 0.70 g of the specific amino acid derivative in the reaction scheme (1), 0.472 g of 1-ethyl-3-(3-dimethyl-aminopropyl)carbodiimide hydrochloride and 0.015 g of 4-(N,N-dimethylamino)pyridine, and the mixture was subjected to a reaction in dichloromethane at room temperature (25° C.) over 2 hours, thereby obtaining a reaction product at a yield of 80%.

From the measured results of nuclear magnetic resonance spectrometry, elemental analysis and infrared spectroscopy, the resultant reaction product was identified as a specific functional amino acid compound (hereinafter also referred to as "Amino Acid Compound (1)") represented by the formula (1).

(Confirmation of Gel-Forming Ability of First Gelling Agent)

With respect to the first gelling agent composed of Amino Acid Compound (1), the gel-forming ability for various organic solvents and liquid crystal compounds was investigated. As a result, it was confirmed that Amino Acid Compound (1) exhibits gel-forming ability for ethyl acetate, benzene and hexane that are organic solvents, particularly exhibits good gel-forming ability for ethyl acetate and benzene among these solvents and exhibits good gel-forming ability for 4-pentyl-4'-cyanobiphenyl, 4-octyl-4'-cyanobiphenyl and a mixture of 4-heptyloxy-4'-cyanobiphenyl and 4-decyloxy-4'-cyanobiphenyl that are liquid crystal compounds.

(Confirmation of Properties of Liquid Crystal Composition Used First Gelling Agent)

Amino Acid Compound (1) was first mixed with 4-octyl-4'-cyanobiphenyl that is a liquid crystal compound, thereby obtaining a gelling mixture (hereinafter also referred to as "Liquid Crystal Composition (1)") containing Amino Acid Compound (1) at a concentration of 1% by mass. The liquid—liquid crystal phase transition temperature of the liquid crystal compound of Liquid Crystal Composition (1) was measured and found to be 37° C. The gelling temperature of Liquid Crystal Composition (1) was also measured and found to be 20° C.

A formed state of a fibrous aggregate in a smectic A phase in a state that the liquid crystal compound constituting the resultant Liquid Crystal Composition (1) had been orientated in one direction was observed through an optical microscope and an atomic force microscope. As a result, it was confirmed that fibers grow in a direction parallel to the orientation direction of molecules of the liquid crystal compound to form a fibrous aggregate.

Amino Acid Compound (1) was then mixed with a mixture (hereinafter also referred to as "Cyanobiphenyl Mixture (1)") of 80% by mass of 4-heptyloxy-4'-cyanobiphenyl and 20% by mass of 4-decyloxy-4'-cyanobiphenyl that are liquid crystal compounds, thereby obtaining a gelling mixture (hereinafter also referred to as "Liquid Crystal Composition (2)") containing Amino Acid Compound (1) at a concentration of 3% by mass. The liquid—liquid crystal phase transition temperature of the liquid crystal compound of Liquid Crystal Composition (2) was measured and found to be 77° C. The gelling temperature of the liquid crystal composition was measured and found to be 46° C.

A formed state of a fibrous aggregate in a smectic A phase in a state that the liquid crystal compound constituting the resultant Liquid Crystal Composition (2) had been orientated in one direction was observed through an optical microscope and a scanning electron microscope. As a result, it was confirmed that fibers grow in a direction perpendicular to the orientation direction of molecules of the liquid crystal to form a fibrous aggregate.

EXAMPLE 2

(Synthesis Example 2 of Tetrathiafulvalene Derivative)

Tetrathiafulvalene in an amount of 0.50 g was reacted with 0.16 g of n-butyllithium in tetrahydrofuran (THF) under temperature conditions of −78° C. This system was purged with carbon dioxide, and hydrochloric acid was additionally added to conduct a reaction at room temperature (25° C.), thereby obtaining a tetrathiafulvalene derivative (hereinafter also referred to as "Tetrathiafulvalene Derivative (2)"), in which X in the general formula (2) denotes a single bond, at a yield of 23%.

(Preparation Example 2 of First Gelling Agent)

With 0.14 g of Tetrathiafulvalene Derivative (2), were mixed 0.21 g of the specific amino acid derivative in the reaction scheme (2), 0.15 g of 1-ethyl-3-(3-dimethylaminopropyl)carbodiimide hydrochloride and 0.0070 g of 4-(N, N-dimethylamino)pyridine, and the mixture was subjected to a reaction in dichloromethane at room temperature (25° C.) over 23 hours, thereby obtaining a reaction product at a yield of 35%.

From the measured results of nuclear magnetic resonance spectrometry, elemental analysis and infrared spectroscopy, the resultant reaction product was identified as a specific functional amino acid compound (hereinafter also referred to as "Amino Acid Compound (2)") represented by the formula (2).

(Confirmation of Gel-Forming Ability of First Gelling Agent)

With respect to the first gelling agent composed of Amino Acid Compound (2), the gel-forming ability for various organic solvents and liquid crystal compounds was investigated. As a result, it was confirmed that Amino Acid Compound (2) exhibits gel-forming ability for acetone, ethanol and ethyl acetate that are organic solvents, and exhibits good gel-forming ability for 4-pentyl-4'-cyanobiphenyl that is a liquid crystal compound.

EXAMPLE 3

(Synthesis Example 1 of Charge Transfer Complex)

In 1.5 milliliters of chloroform, 1.0 mg of Amino Acid Compound (1) prepared as the functional amino acid compound in Example 1 was mixed with 0.1 mg (0.25 equivalents in terms of 12) of iodine as the specific electron acceptable compound, and chloroform in this mixture system was then distilled off, thereby obtaining blackish purple crystals having metallic luster.

Figure 4:
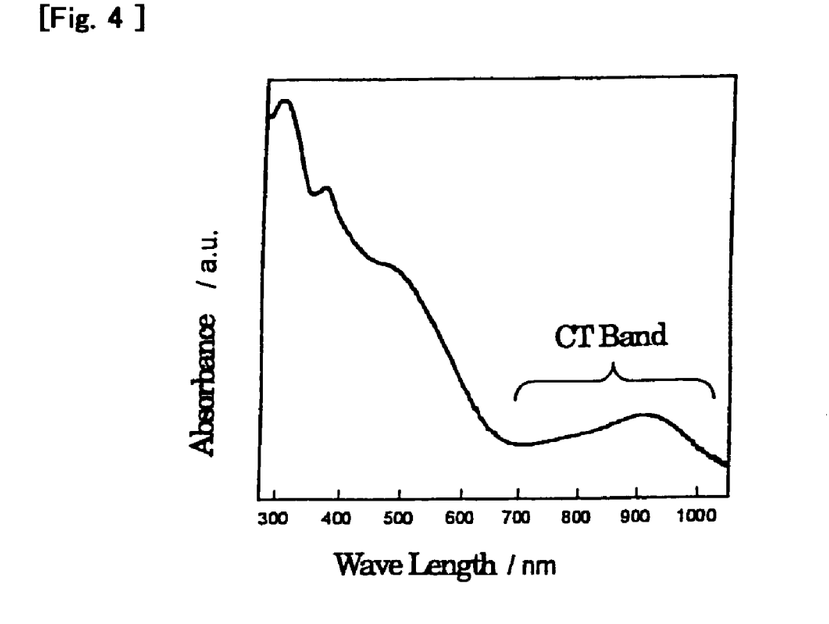

With respect to the resultant crystals, an ultraviolet-visible absorption spectrum was measured. As a result, a CT band (charge transfer absorption band) indicating the formation of a charge transfer complex was observed in the vicinity of a wavelength of 700 to 1,000 nm as illustrated in FIG. 4. It was thus confirmed that Amino Acid Compound (1) is combined with iodine to form a charge transfer complex.

(Confirmation of Properties of Second Gelling Agent)

Amino Acid Compound (1) prepared in Example 1 was mixed with 4-pentyl-4'-cyanobiphenyl that is a liquid crystal compound, thereby obtaining a mixture system (hereinafter also referred to as "5CB/TTF Mixture System") containing Amino Acid Compound (1) at a concentration of 3% by mass. To this 5CB/TTF Mixture System, was added 0.05 equivalents of iodine as the specific electron acceptable compound, thereby obtaining a gelling mixture.

This gelling mixture was observed through an optical microscope. As a result, it was confirmed that a purple fibrous aggregate composed of a charge transfer complex formed by combining Amino Acid Compound (1) with iodine is formed.

Figure 5:
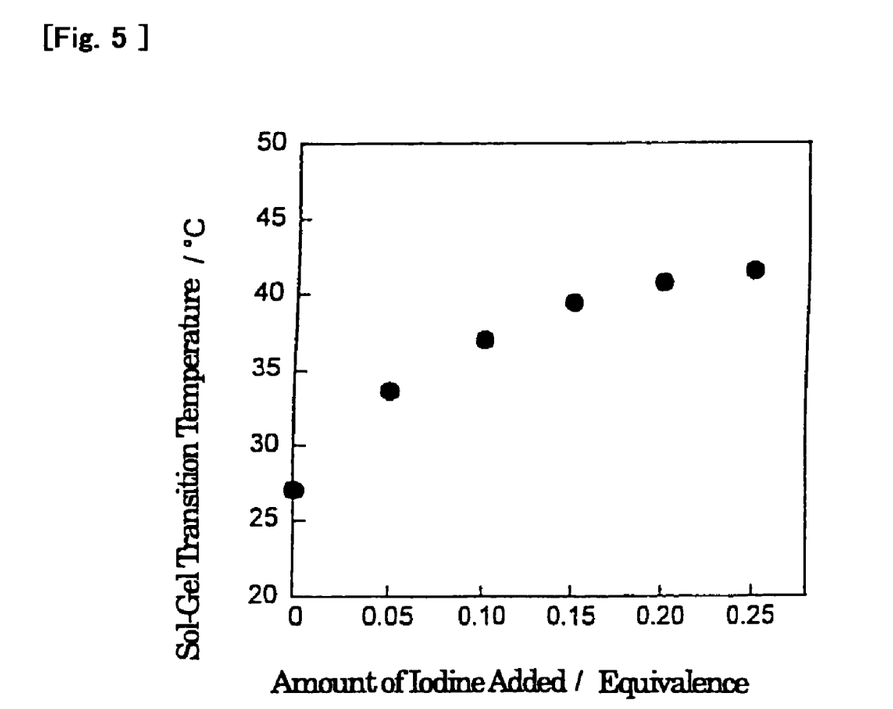

The sol-gel transition temperature of 5CB/TTF Mixture System and sol-gel transition temperatures of gelling mixtures obtained by variously changing the amount of iodine added to 5CB/TTF Mixture System were respectively measured by DSC (differential scanning calorimetry). As a result, it was confirmed that the sol-gel transition temperature becomes higher by adding iodine to 5CB/TTF Mixture System, and the sol-gel transition temperature is more raised as the amount of iodine added increases. The result is shown in FIG. 5.

From this result, it was confirmed that the fibrous aggregate formed by the second gelling agent composed of the specific charge transfer complex becomes that have more excellent heat stability as the proportion of the specific electron acceptable compound added becomes greater.

It was also confirmed that when the amount of iodine added exceeds 0.25 equivalents, the crystallinity of a fibrous aggregate formed by the second gelling agent composed of the resulting specific charge transfer complex is improved, and farther excellent heat stability is achieved on the fibrous aggregate.

(Confirmation of Properties of Liquid Crystal Composition Used Second Gelling Agent)

Amino Acid Compound (1) was mixed with a mixture (hereinafter also referred to as "Phenylbenzoate Mixture (1)") of 50% by mass of 4'-propyloxyphenyl-4-undecyloxybenzoate and 50% by mass of 4'-butyloxyphenyl-4-undecyloxybenzoate that are liquid crystal compounds, thereby obtaining a mixture system containing Amino Acid Compound (1) at a concentration of 1% by mass. To this mixture system, was added 0.2 equivalents of iodine as the specific election acceptable compound, thereby obtaining a gelling mixture (hereinafter also referred to as "Liquid Crystal Composition (3)").

A formed state of a fibrous aggregate in a smectic A phase in a state that the liquid crystal compound constituting the resultant Liquid Crystal Composition (3) had been orientated in one direction was observed through an optical microscope and a scanning electron microscope. As a result, it was confirmed that fibers grow in a direction perpendicular to the orientation direction of molecules of the liquid crystal to form a fibrous aggregate.

INDUSTRIAL APPLICABILITY

The gelling agents according to the present invention may be suitably used as materials forming physical gel.

The liquid crystal compositions according to the present invention have a possibility of being suitably usable as, for example, liquid crystal display devices or anisotropically conductive materials utilizing, for example, the electron-conductive function of the fibrous aggregates formed by the gelling agents. In particular, the liquid crystal composition containing the second gelling agent as the gelling agent has a possibility of being applicable to a molecular electron device, molecular switch or the like.

BRIEF DESCRIPTION OF THE DRAWING

[FIG. 1]

It is a figure typically illustrates a state that a number of molecules have been regularly arranged by forming hydrogen bonds between molecules of Specific Functional Amino Acid Compound (1) constituting a gelling agent.

[FIG. 2]

It is a figure for explanation, which illustrates a state that a gelling agent has formed a fibrous aggregate orientated in the same direction as a specific liquid crystal compound in a state that the specific liquid crystal compound has been orientated in one direction.

[FIG. 3]

It is a figure for explanation, which illustrates a state that a gelling agent has formed a fibrous aggregate orientated in a direction perpendicular to a specific liquid crystal compound in a state that the specific liquid crystal compound has been orientated in one direction.

[FIG. 4]

It is a figure for explanation, which illustrates an ultraviolet-visible absorption spectrum in Example 3.

[FIG. 5]

It is a figure for explanation, which diagrammatically illustrates a relationship between a proportion of iodine added in 5CB/TTF mixture system and the sol-gel transition temperature of the resulting gelling mixture.

BRIEF DESCRIPTION OF MARKS

1 Fibrous aggregate

3 Specific liquid crystal compound molecule

What is claimed is:

1. The gelling agent which is composed of a functional amino acid compound having a tetrathiafulvalenyl group and represented by the following general formula (1):

General formula (1):

wherein X denotes a single bond or a divalent organic group, Y denotes a monovalent organic group, and n is an integer of 8 to 18.

2. A method for producing a gelling agent, which comprises reacting a tetrathiafulvalene derivative with an amino acid derivative in the presence of 1-ethyl-3-(3-dimethylaminopropyl)carbodiimide hydrochloride and 4-(N,N-dimethylamino)pyridine to obtain a functional amino acid compound having a tetrathiafulvalenyl group.

3. A liquid crystal composition comprising a liquid crystal compound and a gelling agent, which is mixed with the liquid crystal compound to form a gelling mixture, wherein the liquid crystal compound is composed of a compound exhibiting a nematic phase or smectic phase, and the gelling agent is the gelling agent according to claim 1.

4. The liquid crystal composition according to claim 3, wherein the liquid crystal compound is 4-octyl-4'-cyanobiphenyl, and the gelling agent is composed of a functional amino acid compound having a tetrathiafulvalenyl group and represented by the following formula (1):

Formula (1):

5. The liquid crystal composition according to claim 3, wherein the liquid crystal compound is a mixture of 4-heptyloxy-4'-cyanobiphenyl and 4-decyloxy-4'-cyanobiphenyl, and the gelling agent is composed of a functional amino acid compound having a tetrathiafulvalenyl group and represented by the following formula (1):

Formula (1):

6. A gelling agent composed of a charge transfer complex comprising, in combination, a functional amino acid compound having a tetrathiafulvalenyl group and an electron acceptable compound selected from a group consisting of iodine, bromine and tetracyanoquinodimethane.

7. The gelling agent according to claim 6, wherein the functional amino acid compound is a compound having a tetrathiafulvalenyl group and represented by the following general formula (1):

General formula (1):

wherein X denotes a single bond or a divalent organic group, Y denotes a monovalent organic group, and n is an integer of 8 to 18.

8. A liquid crystal composition comprising a liquid crystal compound and a gelling agent, which is mixed with the liquid crystal compound to form a gelling mixture, wherein the liquid crystal compound is composed of a compound exhibiting a nematic phase or smectic phase, and the gelling agent is the gelling agent according to claim 6 or 7.

9. A charge transfer complex comprising, in combination, a functional amino acid compound having a tetrathiafulvalenyl group and an electron acceptable compound selected from a group consisting of iodine, bromine and tetracyanoquinodimethane.

10. The charge transfer complex according to claim 9, wherein the functional amino acid compound is a compound having a tetrathiafulvalenyl group and represented by the following general formula (1):

General formula (1):

wherein X denotes a single bond or a divalent organic group, Y denotes a monovalent organic group, and n is an integer of 8 to 18.

* * * * *